United States Patent
Kesig

(10) Patent No.: US 10,028,511 B2
(45) Date of Patent: Jul. 24, 2018

(54) CANOPY AND ASSOCIATED SEAL ARRANGEMENT FOR MIXER

(71) Applicant: Ricky D. Kesig, Troy, OH (US)

(72) Inventor: Ricky D. Kesig, Troy, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 269 days.

(21) Appl. No.: 15/008,912

(22) Filed: Jan. 28, 2016

(65) Prior Publication Data
US 2016/0286823 A1 Oct. 6, 2016

Related U.S. Application Data

(60) Provisional application No. 62/139,924, filed on Mar. 30, 2015.

(51) Int. Cl.
*A21C 1/06* (2006.01)
*A21C 1/14* (2006.01)

(52) U.S. Cl.
CPC .............. *A21C 1/06* (2013.01); *A21C 1/1445* (2013.01)

(58) Field of Classification Search
CPC ......... A21C 1/1445; A21C 1/06; A21C 1/149; A21C 1/1485
See application file for complete search history.

(56) References Cited

U.S. PATENT DOCUMENTS

| | | | |
|---|---|---|---|
| 1,811,472 A | 6/1931 | Lauterbur |
| 2,011,494 A | 8/1935 | Lauterbur |
| 2,155,454 A | 4/1939 | Temple |
| 2,265,552 A | 12/1941 | Sticelber |
| 2,274,220 A | 2/1942 | Sticelber |
| 2,415,711 A | 2/1947 | Sticelber |
| 3,503,344 A | 3/1970 | Sternberg |
| 4,275,568 A | 6/1981 | Zielsdorf |
| 6,047,558 A | 4/2000 | Hall |
| 8,079,749 B2 | 12/2011 | Kitta |
| 2009/0245016 A1 | 10/2009 | Oki et al. |
| 2010/0091608 A1 | 4/2010 | Oki et al. |

FOREIGN PATENT DOCUMENTS

EP 1527688 5/2005

OTHER PUBLICATIONS

Admitted Prior Art, 5 pages, No date.
PCT, International Search Report and Written Opinion, International Application No. PCT/US2016/023670; dated Jul. 5, 2016, 20 pages.

*Primary Examiner* — Tony G Soohoo
(74) *Attorney, Agent, or Firm* — Thompson Hine LLP

(57) ABSTRACT

A horizontal mixer includes a mixer bowl seal arrangement that includes one or more of a tapered canopy and/or a seal assembly that is removable as a unit.

20 Claims, 10 Drawing Sheets

CANOPY AND ASSOCIATED SEAL ARRANGEMENT FOR MIXER

CROSS-REFERENCES

This application claims the benefit of U.S. provisional application Ser. No. 62/139,924, filed Mar. 30, 2015, which is incorporated herein by reference.

TECHNICAL FIELD

This application relates generally to horizontal mixer, such as dough mixers, and, more specifically, to a seal arrangement that facilitates tilt of the mixer bowl to either side of an overhead canopy.

BACKGROUND

The mixer bowls of horizontal mixers tend to be quite large and therefore commonly have a bowl tilt feature so that mixed product such as dough can be emptied from the bowl (e.g., into a dough trough alongside the bowl). During tilt the bowl pivots on a horizontal axis relative to an overhead canopy that covers the open top of the bowl during mixing. Standard canopy sealing for single tilt (i.e., to only one side of the canopy) mixer bowls is with a straight compression seal across the front of the canopy (where the front is the tilt side) and a scraper on the rear of the canopy to scrape the downward facing surface of the canopy during the tilt. For two-way tilting (i.e., to either side of the canopy), seal bars that pneumatically are positioned and compressed against line of contact between the bowl and canopy have been used. However, the pneumatic sealing arrangement is complex and can create maintenance issues.

Bowl mounted seals are also known, but provide less than desirable results and may increase the possibility of seal mount components entering the food product.

It would be desirable to provide a simpler, but effective system for sealing the bowl relative to the canopy, particularly in the case of two-way tilting.

SUMMARY

In one aspect, a new seal arrangement can be universally used for both single and two way tilt mixer configuration. The arrangement utilizes a live seal lip that will compress and slide on the underside of the canopy. In order to compress this seal after it has moved free of the canopy, a lead-in taper may be used. This lead in taper helps prevent the seal from jamming and/or getting bent backwards. An angled lead-in is provided across the length of the bowl that will compress the seal in a sliding method from side to side rather than compressing the entire seal instantaneously in a straight line. A formed lip in the canopy material may also be incorporated to create a gutter which prevents any material on the top of the canopy from draining or dripping into the bowl, particularly during the tilt. The tapered sealing arrangement can lessen the torsional bowl tilting load during compressing of the seal and, with the gutter, also directs the draining of any contaminants to one side away from the product zone and the operator. The arrangement may also provide both increased seal loading/life and more effective sanitation.

In another aspect, a horizontal mixer includes a mixer bowl mounted for rotation about a horizontal axis between an upright mix position and a turned load/unload position. A canopy is located to cover an open top of the bowl when the bowl is in the upright mix position. The canopy includes at least one side having a gutter that angles downward when moving from a first end of the bowl to a second end of the bowl.

In one implementation, the gutter angles outwardly away from the bowl when moving from the first end of the bowl to the second end of the bowl.

In one implementation, the bowl includes a seal member at a top side portion that engages with an underside of the canopy for sealing when the bowl is in the upright mix position.

In one implementation, as the bowl is rotated from the turned load/unload position to the upright mix position, the seal member initially engages the underside of the canopy at a location toward the second end of the bowl and then progressively engages the underside of the canopy in a direction toward an opposite side of the bowl as the bowl continues to rotate toward the upright mix position.

In one implementation, an upper edge of the seal member is oriented substantially horizontally.

In one implementation, the seal member is part of a seal assembly that includes one or more seal backing plates, wherein the seal assembly is supported in a channel formed by one or more brackets mounted to the bowl, wherein the seal assembly is removable as a unit from the bowl without removing the brackets.

In one implementation, the seal assembly includes an inner backing plate and an outer backing plate, wherein a lower portion of the seal member is held between the inner backing plate and the outer backing plate.

In one implementation, the seal assembly further includes a first end plate and a second end plate, the first end plate having a mount portion extending adjacent to the first end of the bowl and mounted thereto by at least one bolt, the second end plate having a mount portion extending adjacent to the second end of the bowl and mounted thereto by at least one bolt.

In a further aspect, a horizontal mixer includes a mixer bowl mounted for rotation about a horizontal axis between an upright mix position and a turned load/unload position. The bowl includes a seal member to engage an underside of a canopy that is located to cover an open top of the bowl when the bowl is in the upright mix position. The seal member and the underside of the canopy are cooperatively configured such that as the bowl is rotated from the turned load/unload position to the upright mix position, the seal member initially engages the underside of the canopy toward a first end of the bowl and then progressively engages the underside of the canopy in a direction toward a second end of the bowl as the bowl continues to rotate toward the upright mix position.

In yet another aspect, a horizontal mixer includes a mixer bowl mounted for rotation about a horizontal axis between an upright mix position and a turned load/unload position. The bowl includes a seal member to engage an underside of a canopy that is located to cover an open top of the bowl when the bowl is in the upright mix position, wherein the seal member is part of a seal assembly that includes one or more seal backing plates, wherein the seal assembly is removable as a unit from the bowl.

In one implementation, the seal assembly is supported in a channel formed by one or more brackets mounted to the bowl, wherein the seal assembly is removable as a unit from the bowl without removing the brackets.

In one implementation, the seal assembly includes an inner backing plate and an outer backing plate, wherein a lower portion of the seal member is held between the inner backing plate and the outer backing plate.

In one implementation, at least one threaded member passes from the inner backing plate, through the seal member and then through the outer backing plate, and a nut is secured to the threaded member at an exterior side of the outer backing plate, and the nut is welded in place to prevent accidental disengagement of the nut.

In one implementation, the seal assembly further includes a first end plate and a second end plate, the first end plate having a mount portion extending adjacent to the first end of the bowl and mounted thereto by at least one removable bolt, the second end plate having a mount portion extending adjacent to the second end of the bowl and mounted thereto by at least one removable bolt.

In one implementation, seal member and the underside of the canopy are cooperatively configured such that as the bowl is rotated from the turned load/unload position to the upright mix position, the seal member initially engages the underside of the canopy toward a first end of the bowl and then progressively engages the underside of the canopy in a direction toward a second end of the bowl as the bowl continues to rotate toward the upright mix position The details of one or more embodiments are set forth in the accompanying drawings and the description below. Other features, objects, and advantages will be apparent from the description and drawings, and from the claims.

DETAILED DESCRIPTION

Figure 1:
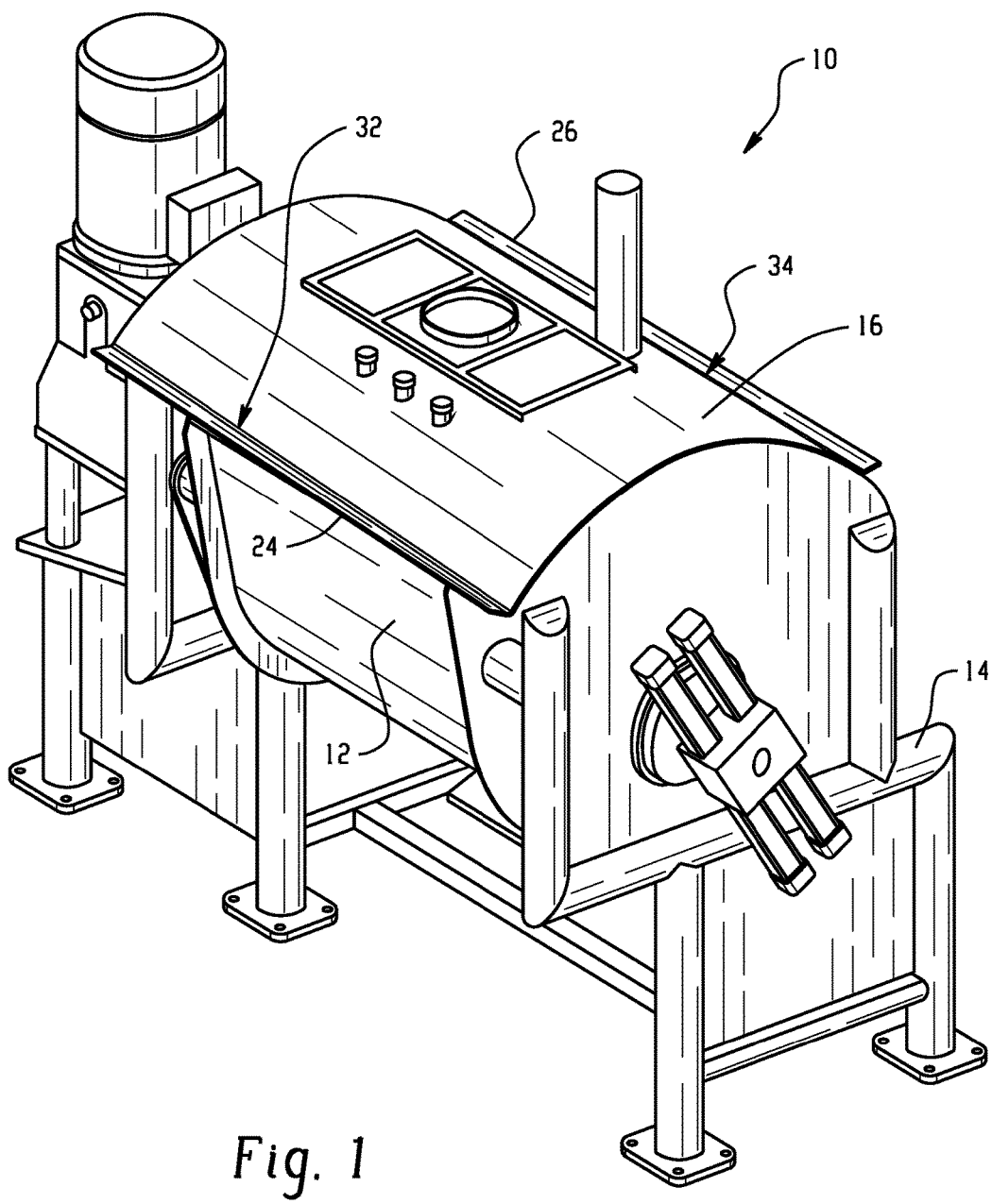
FIG. 1 shows a perspective view of a horizontal mixer.
Figure 2:
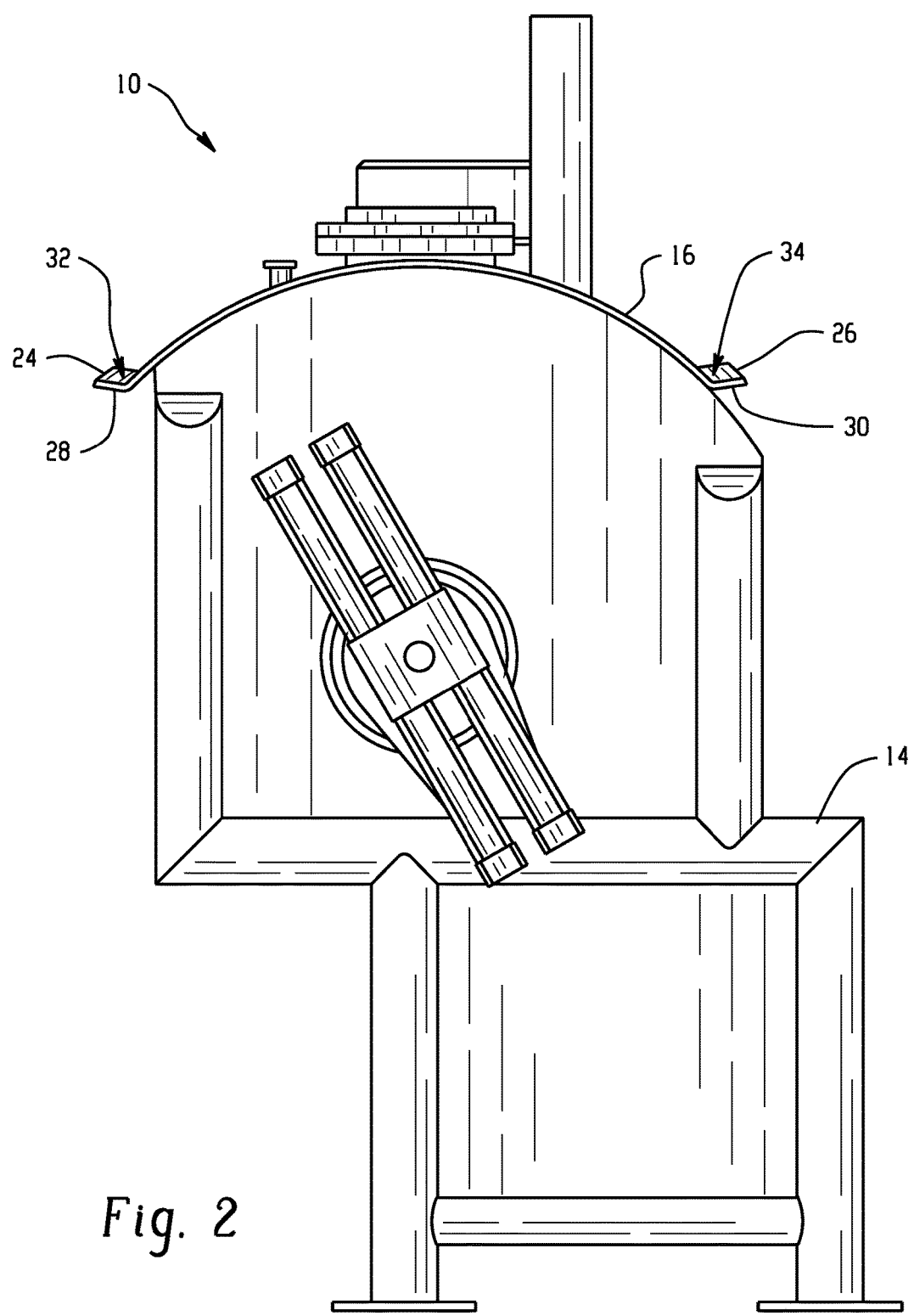
FIG. 2 shows an end view of the mixer of FIG. 1.
Figure 3:
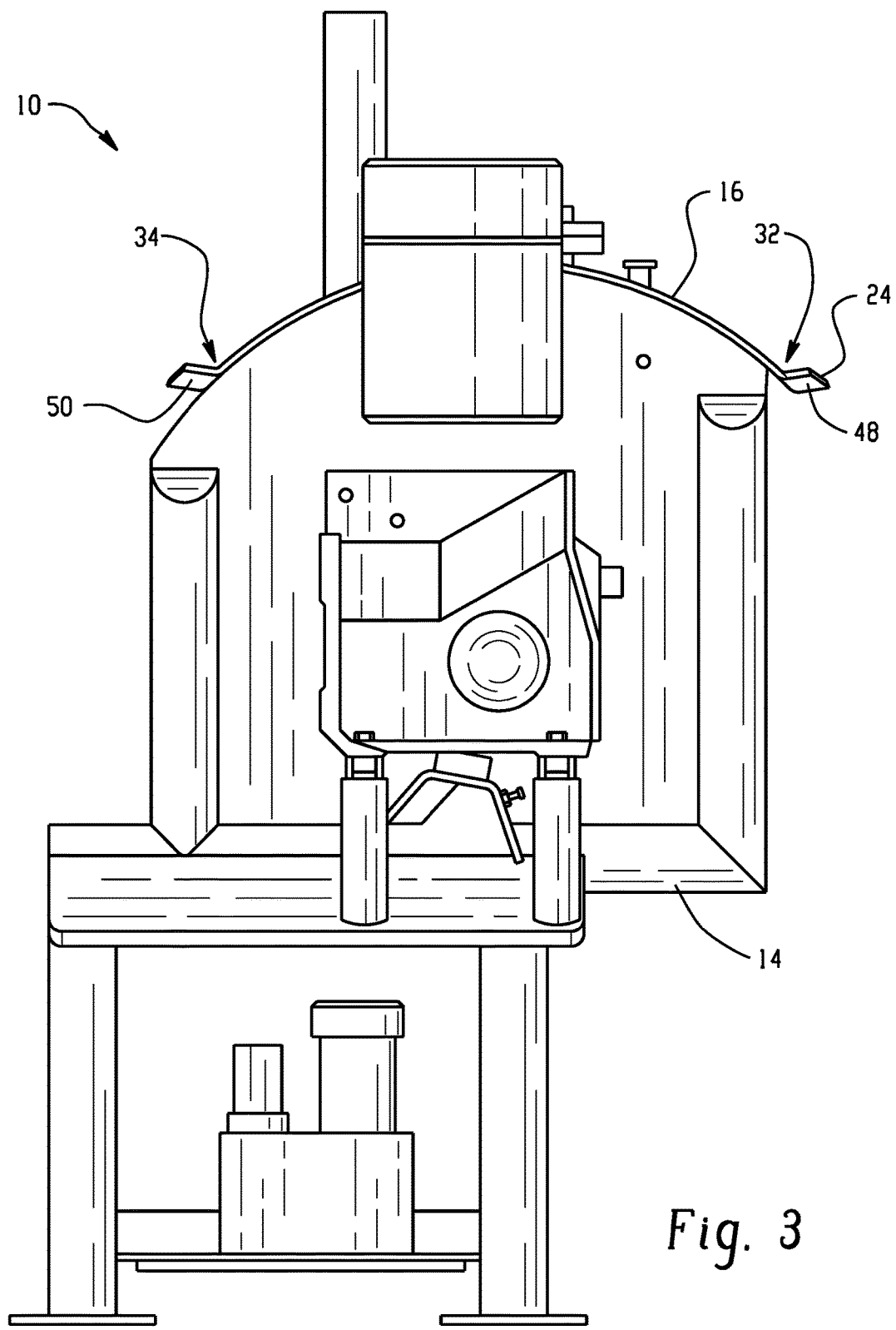
FIG. 3 shows another end view of the mixer of FIG. 1.

Referring to FIGS. 1-7, a horizontal mixer 10 includes a mixing bowl 12 supported on a frame 14 and mounted for relative rotation on the frame 14. The mixing bowl 12 is an open top arrangement. A canopy 16 is located to cover the open top of the bowl when the bowl is in an upright position used for mixing. The mixing bowl 12 is supported at each end by support members 18 that are mounted to respective support plates 20. An agitator (not shown here, but shown in U.S. Pat. No. 8,079,749, which is incorporated herein by reference) is rotatably mounted within the mixing bowl 12. The mixing bowl 12 can be tilted about a horizontal axis 22 for movement between an upright mix position and a turned load/unload position (e.g., per FIG. 2 of U.S. Pat. No. 8,079,729) for loading and unloading of material.

The canopy 16 includes side edges 24 and 26, defined by the free ends of upwardly extending lips or flanges 28 and 30 that are formed on the canopy. The lips/flaps form gutters 32 and 34 at the sides of the canopy 16. The gutters are slightly offset at a non-zero angle relative to horizontal in the direction from end to end of the bowl (as suggested by angle θ in FIG. 5, where line 36 represents horizontal and dashed line 38 represents an extension of the orientation of the gutters) so that any potential contaminant material entering the gutters flows to one lateral end 40 of the mixer well beyond lateral end 42 of the bowl 12. The canopy edges 24 and 26 are similarly angled downward. In the illustrated embodiment the angle of the gutters directs material away from the drive end of the mixer, which is also the operator end of the mixer.

Figure 4:
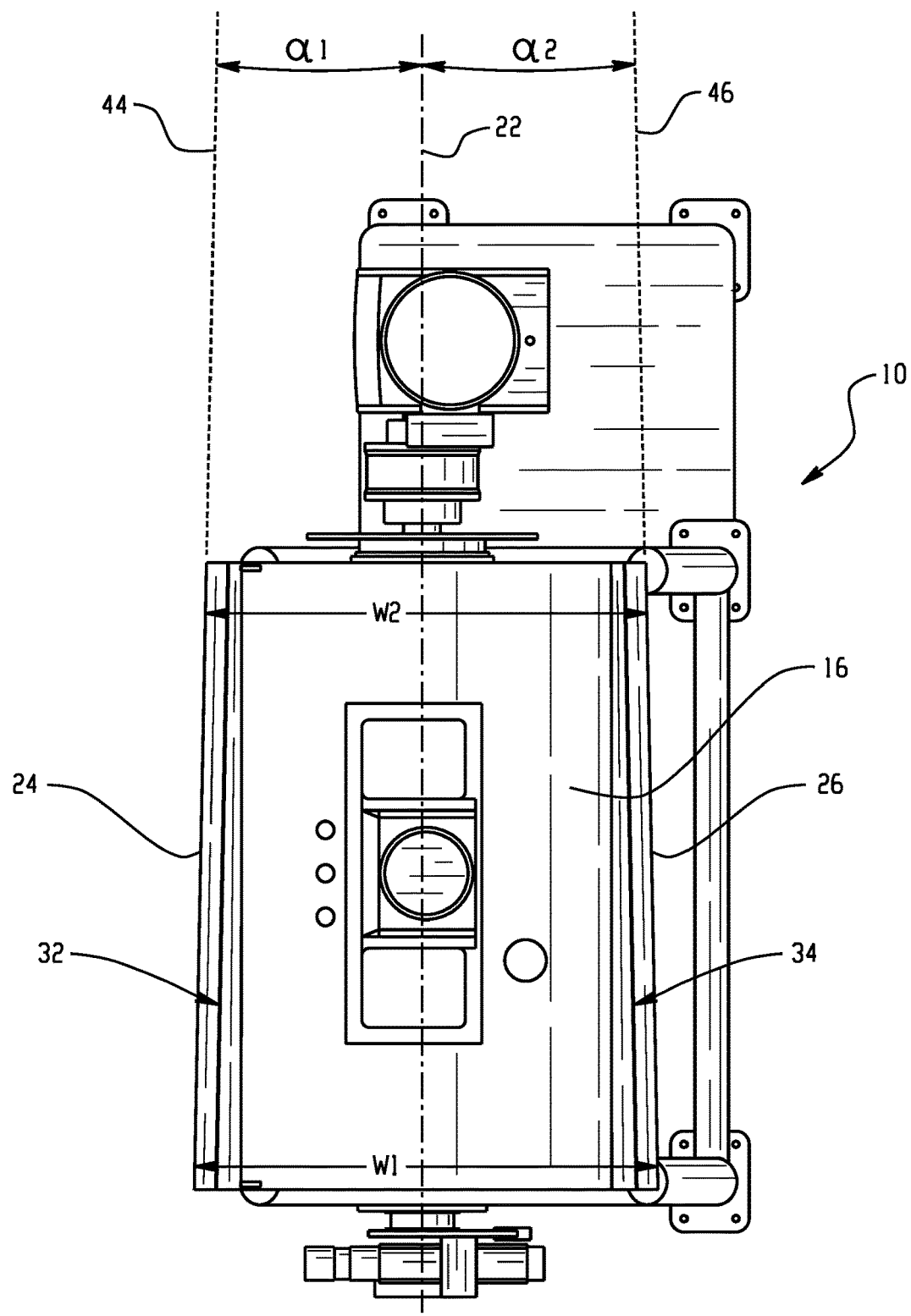
FIG. 4 shows a top plan view of the mixer of FIG. 1.
Figure 5:
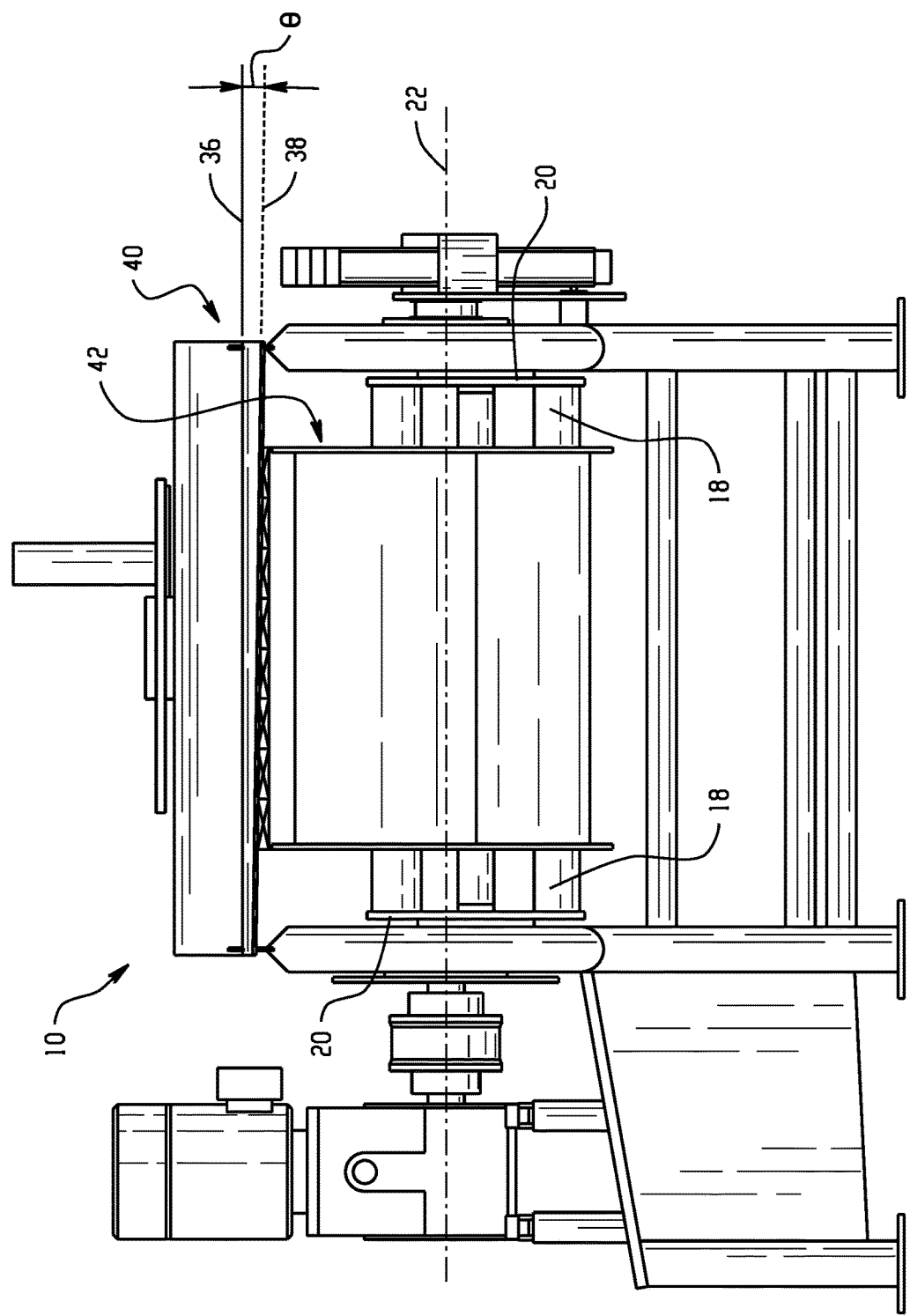
FIG. 5 shows a side elevation view of the mixer of FIG. 1.

As seen in FIG. 4, the side edges 24 and 26 of the gutter lips/flanges 32 and 34 also angle slightly outward in the direction from end to end of the bowl relative to the horizontal pivot axis 22 of the bowl and away from the bowl (as suggested by angles α1 and α2 in FIG. 4, where dashed lines 44 and 46 represent an extension of the linear direction of the side edges 24 and 26), as does the gutter itself, including the undersides surface portions 48 and 50 of the gutters. This configuration results in a canopy width or depth W1 (in top plan view) at a location over one end of the bowl that is greater than the canopy width or depth W2 at a location over the other end of the bowl.

Figure 6:
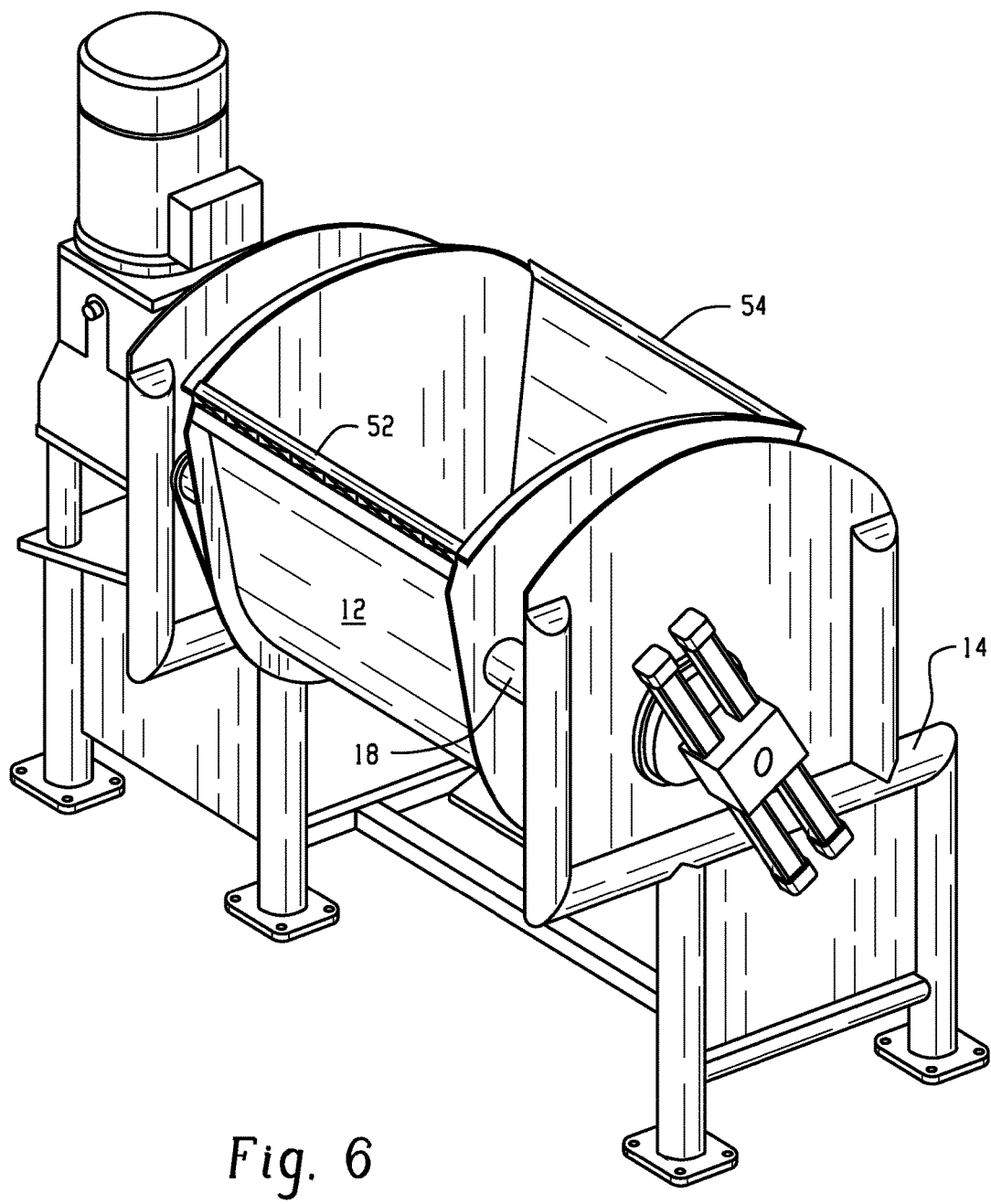
FIG. 6 shows a partial perspective view of the mixer of FIG. 1 with canopy not shown.
Figure 7:
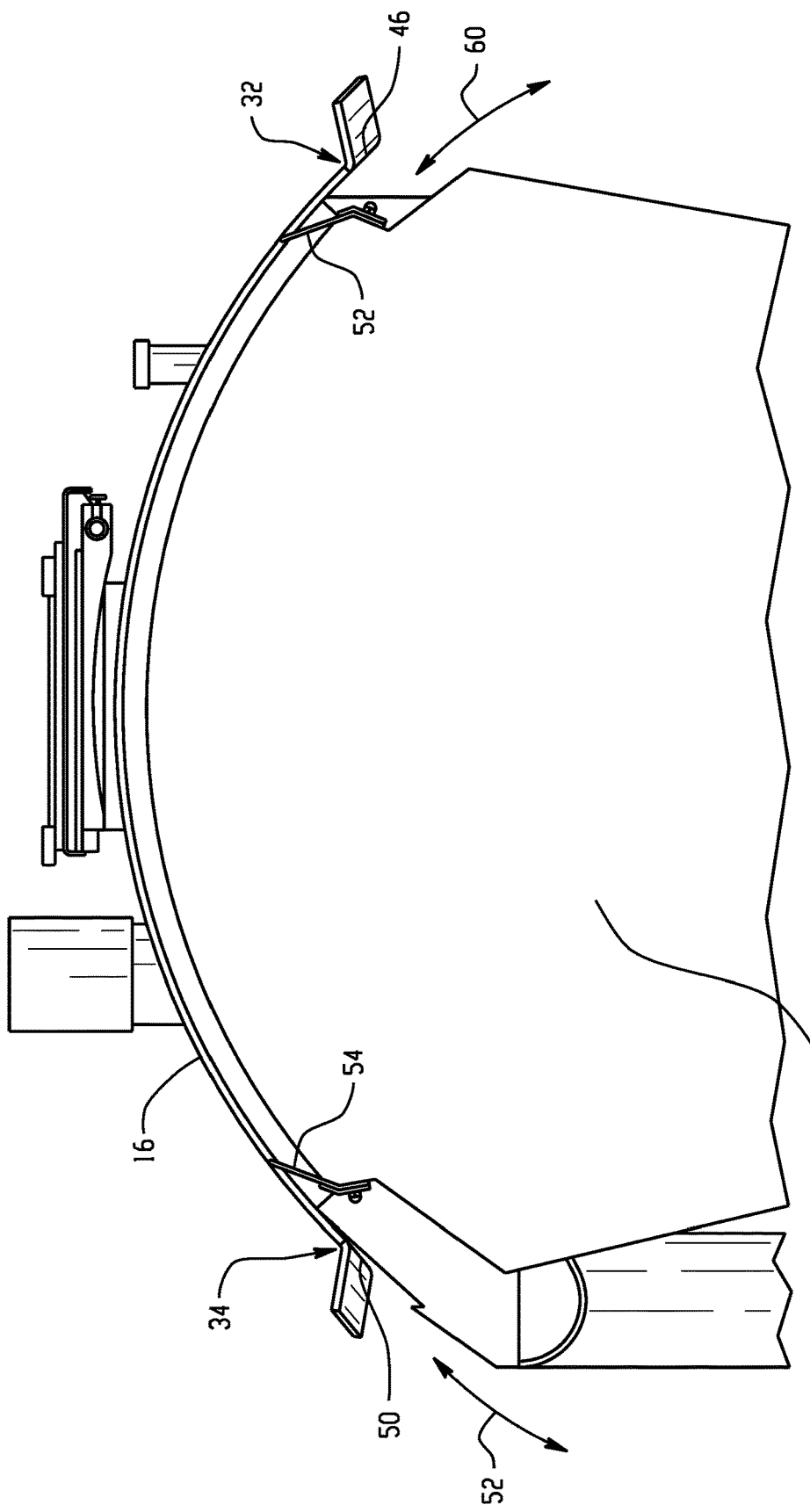
FIG. 7 shows an enlarged end view of the bowl and seal arrangement.

As seen in FIG. 6, the upper portion of each side of the mixer bowl includes a respective upwardly and inwardly extending scraper type seal 52 and 54. The seals are oriented generally horizontally in side elevation view (e.g., the upper edge of each seal extends horizontally, in parallel with the tilt axis 22 of the mixer bowl). The seals may be of slightly flexible polymeric material that allows for some give of the seals when they come into contact with the canopy 16. In this regard, the downward and outward taper of the underside portions 48 and 50 of the gutters causes the seals 52 and 54 to initially come into contact with the lower, outer end of the underside of the gutter when the bowl 12 is being rotated from a turned load/unload position back up to its upright position.

Thus, if the bowl 12 is rotated open to the load/unload position at the canopy side including gutter 32 (per arrow 60 in FIG. 7), as the bowl is rotated back up to the upright position one end of the seal 52 will initially come into contact with gutter underside portion 48 at bowl end 42 and progressively come into contact with the rest of gutter underside portion 48 as the bowl continues to rotate upward, achieving a lead-in that compresses the seal 52 in a progressive, sliding method as the seal 52 comes into contact with the canopy 16. Similarly, if the bowl is rotated open to a load/unload position at the canopy side including gutter 34 (per arrow 62 in FIG. 7), as the bowl is rotated back up to the upright position one end of the seal 54 will initially come into contact with gutter underside portion 50 at bowl end 42 and progressively come into contact with the rest of gutter underside portion 50 as the bowl continues to rotate upward, achieving a lead-in that compresses the seal 54 in a progressive, sliding method as the seal 54 comes into contact with the canopy 16.

Figure 8:
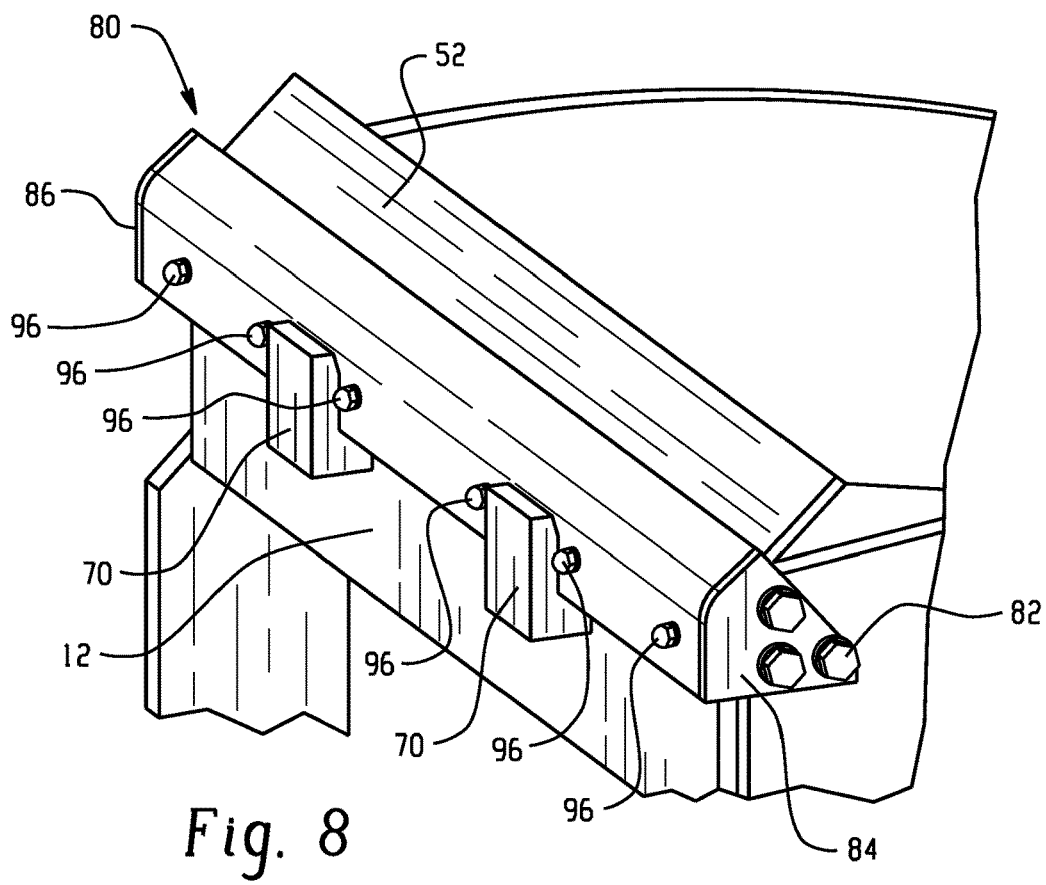
FIG. 8 depicts a seal assembly mount arrangement.

The seal members may be mounted to the bowl in any suitable manner. For example, the seal members may be bolted directly to the upper side portions of the bowl. However, in other variations each seal members may be part of a respective seal assembly that is removably mounted to the bowl. In this regard, referring to FIG. 8, the bowl includes spaced apart brackets 70 mounted thereto (e.g., welded in place) and that form a channel that receives and supports a seal assembly 80 that includes seal member 52. The seal assembly 80 is removable as a unit from the bowl 12, without removing the brackets 70, by simple removal of one or more end bolts 82 that pass through end plates 84, 86 of the seal assembly into the ends of the bowl 12. The seal assembly 80 may include one or more seal backing plates.

Figure 9:
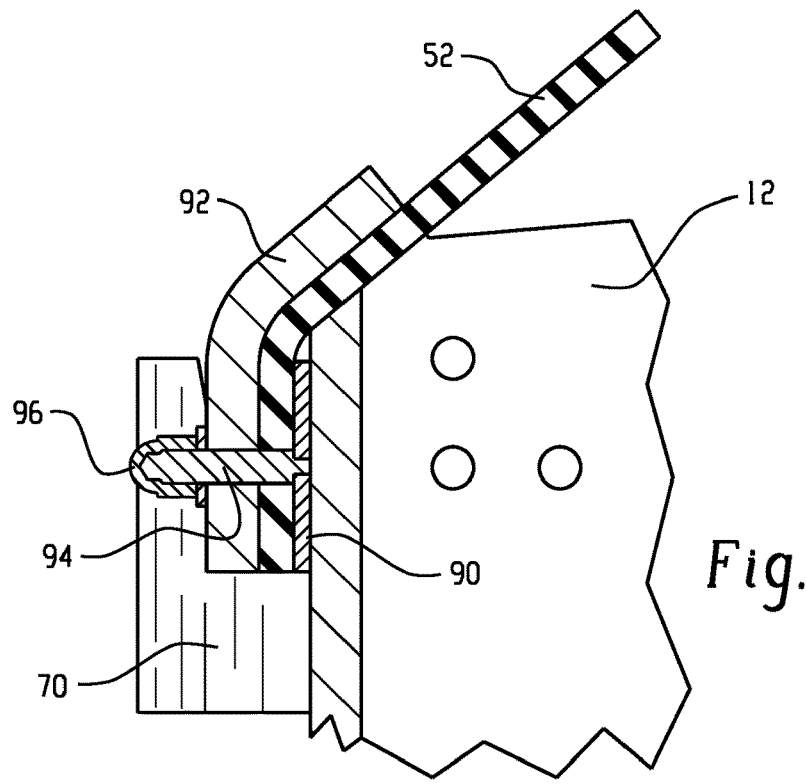
FIG. 9 depicts one exemplary cross-section of the seal assembly of FIG. 8.
Figure 10:
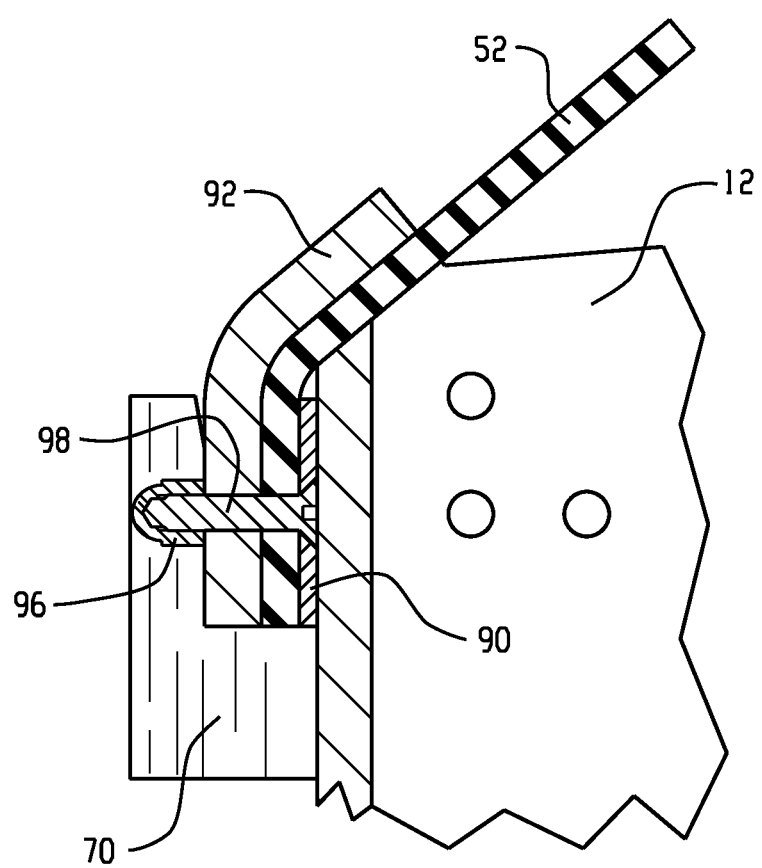
FIG. 10 depicts another exemplary cross-section of the seal assembly of FIG. 8.

In one implementation represented by the cross-section of FIG. 9, the seal assembly 80 includes an inner backing plate 90 and an outer backing plate 92, with a lower portion of the seal member 52 held between the inner backing plate and the outer backing plate. Multiple, spaced apart end-threaded studs or bolts 94 may be welded to the inner backing plate 90 and pass through openings in the seal member 52 and outer backing plate 92 so that nuts (e.g., acorn nuts) 96 can be connected to the studs to secure the assembly together. The nuts 96 may by spot-welded to prevent the seal assembly from being disassembled, significantly reducing the chance that the nuts 96 may unintentionally unthread and separate, falling into the food product. In another variation represented by FIG. 10, nuts 96 may be welded in place to the outer backing plate 92 before seal assembly, and then screws 98 passed through openings in the inner backing plate 90, seal member 52 and outer backing plate 92 into engagement with the nuts to complete the seal assembly.

Figure 11:
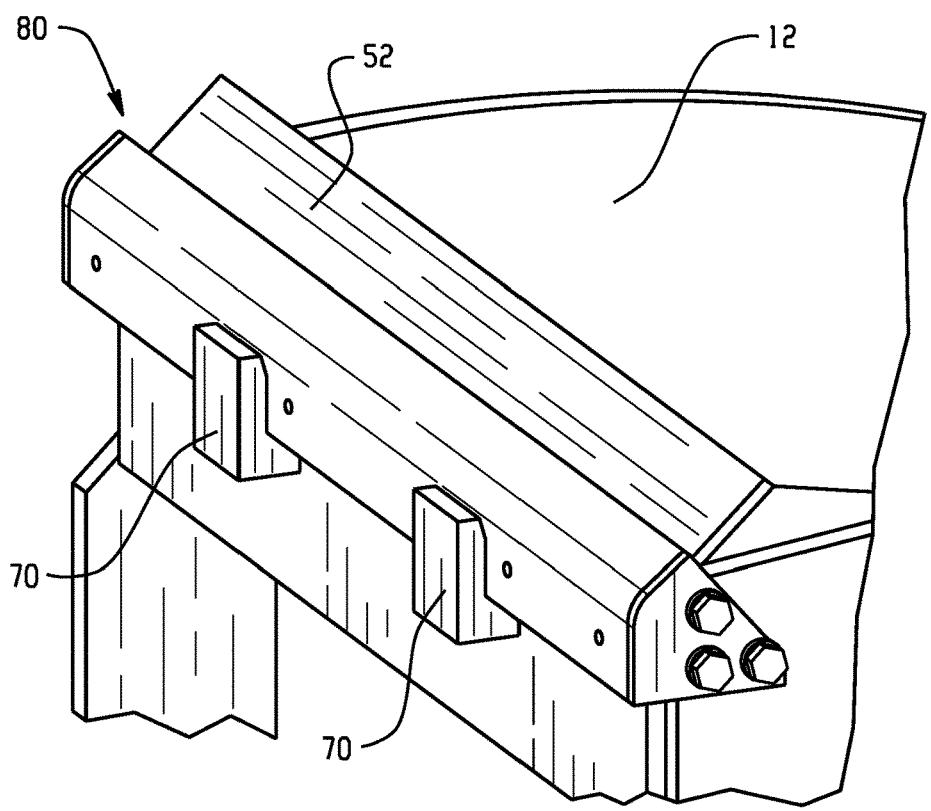
FIG. 11 depicts another seal assembly mount arrangement.
Figure 12:
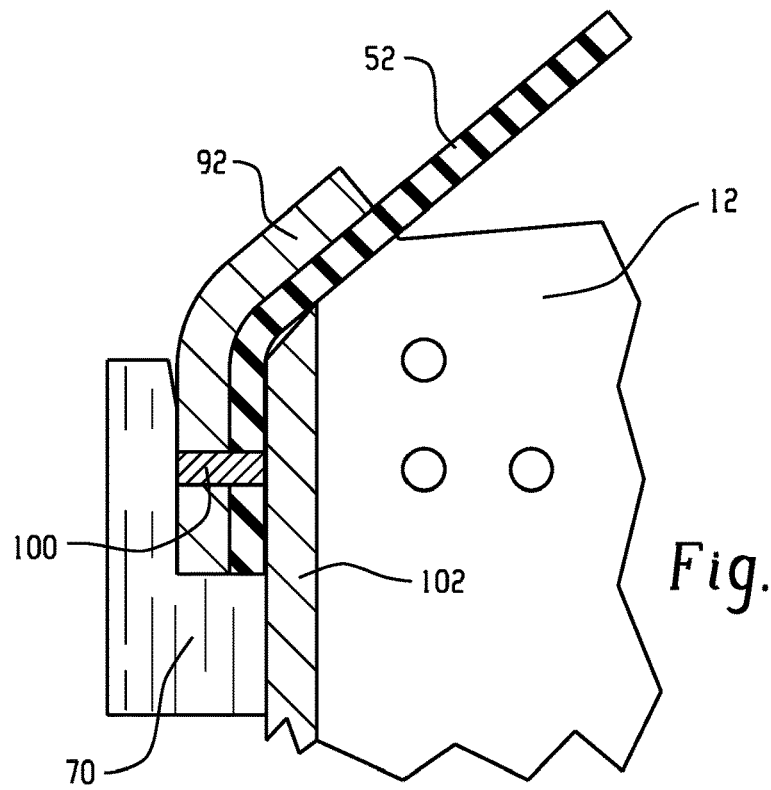
FIG. 12 depicts an exemplary cross-section of the seal assembly of FIG. 11.

FIGS. 11 and 12 depict another variation in which the nuts and inner backing plate are eliminated. In this arrangement, pins 100 may be welded to the outer backing plate 92 and pass through openings in the seal member 52. When the seal assembly 80 is mounted within the channel, the wall 102 of the bowl 12 prevents the seal member from moving off of the pins 100, and thus the seal member 52 is retained in place for mixer operation.

It is to be clearly understood that the above description is intended by way of illustration and example only, is not intended to be taken by way of limitation, and that other changes and modifications are possible.

The invention claimed is:

1. A horizontal mixer comprising,
   a mixer bowl mounted for rotation about a horizontal axis between an upright mix position and a turned load/unload position, wherein the horizontal axis runs between a first end of the bowl and a second end of the bowl;
   a canopy located to cover an open top of the bowl when the bowl is in the upright mix position, the canopy including at least one side having a gutter with a first end toward the first end of the bowl and a second end toward the second end of the bowl, wherein the gutter angles downward when moving from the first end of the bowl to the second end of the bowl such that the second end of the gutter is lower than the first end of the gutter.

2. The mixer of claim 1 wherein the gutter angles outwardly away from the bowl when moving from the first end of the bowl to the second end of the bowl.

3. A horizontal mixer comprising,
   a bowl mounted for rotation about a horizontal axis between an upright mix position and a turned load/unload position;
   a canopy located to cover an open top of the bowl when the bowl is in the upright mix position, the canopy including at least one side having a gutter that angles downward when moving from a first end of the bowl to a second end of the bowl,
   wherein the gutter angles outwardly away from the bowl when moving from the first end of the bowl to the second end of the bowl,
   wherein the bowl includes a seal member at a top side portion that engages with an underside of the canopy for sealing when the bowl is in the upright mix position.

4. The mixer of claim 3 wherein, as the bowl is rotated from the turned load/unload position to the upright mix position, the seal member initially engages the underside of the canopy at a location toward the second end of the bowl and then progressively engages the underside of the canopy in a direction toward an opposite side of the bowl as the bowl continues to rotate toward the upright mix position.

5. The mixer of claim 4 wherein an upper edge of the seal member is oriented substantially horizontally.

6. The mixer of claim 3 wherein the seal member is part of a seal assembly that includes one or more seal backing plates, wherein the seal assembly is supported in a channel formed by one or more brackets mounted to the bowl, wherein the seal assembly is removable as a unit from the bowl without removing the brackets.

7. The mixer of claim 6 wherein the seal assembly includes an inner backing plate and an outer backing plate, wherein a lower portion of the seal member is held between the inner backing plate and the outer backing plate.

8. The mixer of claim 7 wherein the seal assembly further includes a first end plate and a second end plate, the first end plate having a mount portion extending adjacent to the first end of the bowl and mounted thereto by at least one bolt, the second end plate having a mount portion extending adjacent to the second end of the bowl and mounted thereto by at least one bolt.

9. A horizontal mixer comprising,
   a mixer bowl mounted for rotation about a horizontal axis between an upright mix position and a turned load/unload position, wherein the horizontal axis runs between a first end of the bowl and a second end of the bowl, the bowl including a seal member to engage an underside of a canopy that is located to cover an open top of the bowl when the bowl is in the upright mix position, wherein the seal member and the underside of the canopy are cooperatively configured such that as the bowl is rotated from the turned load/unload position to the upright mix position, the seal member initially engages the underside of the canopy at a location on the canopy toward the first end of the bowl and then progressively comes into engagemement with other parts of the underside of the canopy in a direction toward the second end of the bowl as the bowl continues to rotate toward the upright mix position.

10. The horizontal mixer of claim 9 wherein the seal member includes an upper edge that is oriented substantially horizontally and the underside of the canopy includes a side portion that angles downwardly from the second end of the bowl toward the first end of the bowl.

11. The horizontal mixer of claim 10 wherein the side portion is comprised by the underside of a canopy gutter that angles downward when moving from the second end of the bowl to first end of the bowl.

12. The mixer of claim 9 wherein the seal member is part of a seal assembly that includes one or more seal backing plates, wherein the seal assembly is supported in a channel formed by one or more brackets mounted to the bowl, wherein the seal assembly is removable as a unit from the bowl without removing the brackets.

13. The mixer of claim 12 wherein the seal assembly includes an inner backing plate and an outer backing plate, wherein a lower portion of the seal member is held between the inner backing plate and the outer backing plate.

14. The mixer of claim 13 wherein the seal assembly further includes a first end plate and a second end plate, the first end plate having a mount portion extending adjacent to the first end of the bowl and mounted thereto by at least one bolt, the second end plate having a mount portion extending adjacent to the second end of the bowl and mounted thereto by at least one bolt.

15. A horizontal mixer comprising,
a mixer bowl mounted for rotation about a horizontal axis between an upright mix position and a turned load/unload position, the bowl including a seal member to engage an underside of a canopy that is located to cover an open top of the bowl when the bowl is in the upright mix position, wherein the seal member is part of a seal assembly that includes at least one seal backing plate, wherein the seal assembly is removable as a unit from the bowl.

16. The horizontal mixer of claim 15 wherein the seal assembly is supported in a channel formed by one or more brackets mounted to the bowl, wherein the seal assembly is removable as a unit from the bowl without removing the brackets.

17. The horizontal mixer of claim 15 wherein the seal assembly includes an inner backing plate and an outer backing plate, wherein a lower portion of the seal member is held between the inner backing plate and the outer backing plate.

18. The horizontal mixer of claim 17 wherein at least one threaded member passes from the inner backing plate, through the seal member and then through the outer backing plate, and a nut is secured to the threaded member at an exterior side of the outer backing plate, and the nut is welded in place to prevent accidental disengagement of the nut.

19. The mixer of claim 17 wherein the seal assembly further includes a first end plate and a second end plate, the first end plate having a mount portion extending adjacent to the first end of the bowl and mounted thereto by at least one removable bolt, the second end plate having a mount portion extending adjacent to the second end of the bowl and mounted thereto by at least one removable bolt.

20. The mixer of claim 15 wherein seal member and the underside of the canopy are cooperatively configured such that as the bowl is rotated from the turned load/unload position to the upright mix position, the seal member initially engages the underside of the canopy toward a first end of the bowl and then progressively engages the underside of the canopy in a direction toward a second end of the bowl as the bowl continues to rotate toward the upright mix position.

* * * * *